United States Patent [19]

Snijders et al.

[11] Patent Number: 5,509,003
[45] Date of Patent: Apr. 16, 1996

[54] TDM DATA COMMUNICATIONS NETWORK WHEREIN EACH DATA FRAME IS DIVIDED INTO RESPECTIVE LOWER RATE SUB-FRAMES FOR RESPECTIVE SETS OF SUBSTATIONS, AND MAIN STATION AND SUBSTATION FOR USE THEREIN

[75] Inventors: Wilfred A. M. Snijders; Petrus A. M. Van Grinsven, both of Eindhoven, Netherlands

[73] Assignee: U.S. Philips Corporation, New York, N.Y.

[21] Appl. No.: 273,529

[22] Filed: Jul. 11, 1994

[30] Foreign Application Priority Data

Jul. 9, 1993 [EP] European Pat. Off. ............. 93202019

[51] Int. Cl.⁶ ..................... H04J 3/16; H04B 7/212; H04L 5/22
[52] U.S. Cl. .................. 370/29; 370/95.1; 370/95.3
[58] Field of Search ............... 370/54, 58.1, 58.2, 370/58.3, 60, 79, 80, 82, 83, 84, 94.1, 94.2, 95.1, 95.3, 99, 100.1, 103, 105.1, 105.3, 105.4, 106, 110.1, 112, 24, 29, 85.7; 455/51.1, 53.1, 54.1, 67.1, 132, 137, 139; 375/354, 356, 362, 364, 365, 368, 371

[56] References Cited

U.S. PATENT DOCUMENTS

| | | | |
|---|---|---|---|
| 4,852,090 | 7/1989 | Borth | 370/95.3 |
| 5,007,045 | 4/1991 | Tsuzuki | 370/94.1 |
| 5,050,166 | 9/1991 | Cantoni et al. | 370/82 |
| 5,086,470 | 2/1992 | Ballance | 370/95.3 |
| 5,124,985 | 6/1992 | Hoshikawa | 370/95.3 |
| 5,199,031 | 3/1993 | Dahlin | 370/105.4 |
| 5,231,635 | 7/1993 | Travers et al. | 370/95.1 |
| 5,251,217 | 10/1993 | Travers et al. | 370/79 |
| 5,341,365 | 8/1994 | Clarke | 370/95.3 |
| 5,398,247 | 3/1995 | Delprat et al. | 370/95.1 |
| 5,412,650 | 5/1995 | Davies | 370/82 |

OTHER PUBLICATIONS

C. E. Hoppitt & D. E. A. Clarke, "The provision of telephon over passive optical networks", Br Telecom Tech. J, vol. 7, No. 2, Apr. 1989, pp. 100–114.

Primary Examiner—Alpus H. Hsu
Attorney, Agent, or Firm—Leroy Eason

[57] ABSTRACT

Telecommunications passive optical networks are known which employ a TDMA frame structure for transmission between a main station and a number of substations. Due to increased capacity demands and still further service demands, there is a need for higher bit rates over such networks. The invention provides a high bit rate passive optical network wherein the substations operate at only a fraction of the network bit rate, and so are hardly more complex than in lower bit rate networks. That is achieved by formation by the main station of sub-frames of the data intended for transmission to a number of the substations, and bit interleaving the sub-frames to form a data frame which is transmitted over the optical fiber cable. Each substation is adjusted to only listen to the sub-frame to which it is assigned. In one embodiment the substations are automatically adjusted to only listen to a particular phase in the interleaved bit stream, which is identified by phase adjustment data transmitted by the main station in a housekeeping time slot of the data frame.

9 Claims, 3 Drawing Sheets

5,509,003

TDM DATA COMMUNICATIONS NETWORK WHEREIN EACH DATA FRAME IS DIVIDED INTO RESPECTIVE LOWER RATE SUB-FRAMES FOR RESPECTIVE SETS OF SUBSTATIONS, AND MAIN STATION AND SUBSTATION FOR USE THEREIN

BACKGROUND OF THE INVENTION

1. Field of the Invention

The present invention relates to a telecommunications network comprising a main station and a plurality of substations, in which network communication between the main station and the substations occurs in a data-frame with a predetermined bit rate via a transmission channel on the basis of a multiple access protocol, which channel is at least partially common to the substations. Such a telecommunications network can be a passive optical network.

The present invention further relates to a main station for use in such a network.

The present invention further relates to a substation for use in such a system.

2. Description of the Related Art

A telecommunications network of this kind is known from the article, "The provision of telephony over passive optical networks", C. E. Hoppitt and D. E. A. Clarke, Br. Telecom Technol. Journal, Vol. 7, No. 2, April 1989, pp. 100–114, in which a TPON (Telephony on a Passive Optical Network) is disclosed comprising a head-end station or exchange termination as a main station, broadcasting TDMA (Time Division Multiple Access) frames to a number of terminations on an optical transmission channel or glass fibre in a downstream direction. A single fibre is fed from the exchange and fanned out via passive optical splitters at a cabinet and at distribution point positions to feed to the terminations. In an upstream direction, each termination transmits data in a predetermined time slot. The data from the different terminations interleave at the head-end into a TDMA frame of a predetermined format. Several variants of terminations are described, such as "House terminations" (fibre-to-the home) for individual subscribers, "Business terminations" (fibre-to-the-building) for small business customers having a number of subscriber lines coupled to the termination, or "Street TPON termination" (fibre-to-the-curb), the latter being quite similar to the "Business termination" apart from the fact that "copper lines" are fed to individual subscribers. Such a network is generally referred to as a BTS (Bit Transport System), the exchange termination being referred to as a BTS-Master and the terminations being referred to as ONUs (Optical Network Units). In the known optical network the bit rate typically is 20.48 Mbit/s, or 20 Mbit/s for short. Such a network capacity is suitable for transporting 8 interleaved 2 Mbit/s streams, e.g. each stream transporting 30 speech channels of 64 kbit/s. Apart from speech data or other subscriber data the 20 Mbit/s datastream comprises overhead data for controlling purposes, such as housekeeping data to control the operation of the BTS, laser power level, multiplexing, or the like. In such networks there is a demand for still higher capacities, from a marketing point of view or for higher bit rate demands for supporting new evolutionary services. But with higher bit rates, the network complexity increases as does the power dissipation. Also, upgrading terminations for supporting higher bit rates would require a technological leap forward as, due to passive splitting, processing in the terminations has to be done at the higher bit rate. This leads to a considerably more expensive network, in which especially the substations or ONUs considerably contribute to the overall network costs.

SUMMARY OF THE INVENTION

It is an object of the present invention to provide a telecommunications network of the above kind which is capable of handling higher bit rates with only a moderate increase of the overall network complexity, especially at the side of the network terminations.

To this end a telecommunications network according to the present invention is characterised in that the main station comprises means for splitting data intended for substations into at least two logical sub-frames, and means for assembling a sub-frames into the data-frame which comprises a bit interleaved composition of sub-frames substation characterising data is also assembled into the data-frame, the data intended for a particular substation being put into a time slot of a particular sub-frame of each data frame. The substations comprise means for adjusting themselves to reception of data in the sub-frame intended for them on the basis of the substation characterising data. A much higher network capacity is achieved, even through the substations are hardly more complex than in lower bit rate optical networks. In the substations only some hardware has to operate at the higher bit rate, such as the receiver front end, a laser driver, and a clock recovery circuit, whereas most other circuitry can still operate at the lower bit rate of prior networks. Also, the main station is simpler as compared to a network designed for operation at a higher bit rate.

The present invention is based upon the insight that typically the bandwidth needs of an individual substation lie between a few hundred kbit/s to a maximum of 2–4 Mbit/s. Since that is only a fraction of the total system capacity, there is hardly any loss in functionality if a substation can access only part of the transmission channel at a network level. For example, if a splitting into two sub-frames of substation data is produced at the side of the main station, the substation need only access 'odd' or 'even' sub-frame. Functionally, such a 'twin'-system can then be considered as two 'half rate' or 20 Mbit/s systems in parallel respectively serving 'odd' and 'even' 20 Mbit/s substations via a common fibre.

In an embodiment of the network according to the present invention, the substations are arranged to send data to the main station in time slot positions within the data-frame corresponding to their assigned positions in a received data frame from the main station. The main station comprises means for dis-assembling bit interleaved data in the data-frame to derive at least two logical sub-frames of data from particular substations, and also comprises means for combining the sub-frames. It is achieved that the main station as well as the substations operate in a bit interleaved way. For achieving that the substations transmit in time slots as assigned by the main station, the substations are ranged. Such ranging is described, inter alia, in European Patent Applications No. 93200743.8 and No. 93200742.0, both filed on Mar. 15, 1993, which have since been published as EP 0,616,43 and EP 0,616,444, respectively, and correspond to pending U.S. applications No. 08/213,483 and No. 08/213,485, respectively, both filed on Mar. 14, 1994, and assigned to the present assignee. Such pending applications are incorporated herein by reference.

In an embodiment of the network according to the present invention, the means for assembling and dis-assembling data frames are separate means operating at the predetermined bit rate divided by n, n being the number of logical sub-frames, and the means for splitting and combining operate at the predetermined bit rate. In this embodiment a high bit rate datastream is split in the main station into a number of channels, which are thereafter multiplexed on the transmission channel or fibre. It is achieved that in the main station channel operations such as scrambling can still be done at a lower bit rate.

In another embodiment of the network according to the present invention, the means for assembling and dis-assembling, and the means for splitting and combining are integrated means operating at the predetermined bit rate. With such integrated means it is advantageous that no separate frame assemblers are required, although there is an increased complexity of the frame assembler.

In a further embodiment of the network according to the present invention, the substation characterising data comprise a general synchronisation word followed by a substation can type identifier. It is achieved that the substations first synchronise on the synchronisation word in a usual way, and than simply adjust their time to the correct phase in the interleaved bitstream so as to listen only to the part of the data stream addressed for them.

In a still further embodiment of the network according to the present invention, the substations adjust themselves to a particular phase in the bit interleaved composition of sub-frames on the basis of phase adjustment data received from the main station in a housekeeping control data time slot. The substations can be remotely adjusted by the main station so as to listen to a different phase in the interleaved bitstream. Thus, when the network is operational, the network load can be optimally distributed. This plays a role if the network is almost loaded to maximum capacity and there is still capacity left for a relatively high capacity substation, though not in one sub-frame. The main station then reconfigures the network automatically by redirecting smaller substations to other sub-frames and by assigning the high capacity substation to the sub-frame into which capacity was so released.

BRIEF DESCRIPTION OF THE DRAWINGS

The present invention will now be described, by way of example, with reference to the accompanying drawings, wherein FIG. 1 schematically shows a telecommunications network according to the present invention.

DESCRIPTION OF THE PREFERRED EMBODIMENTS

Figure 1:
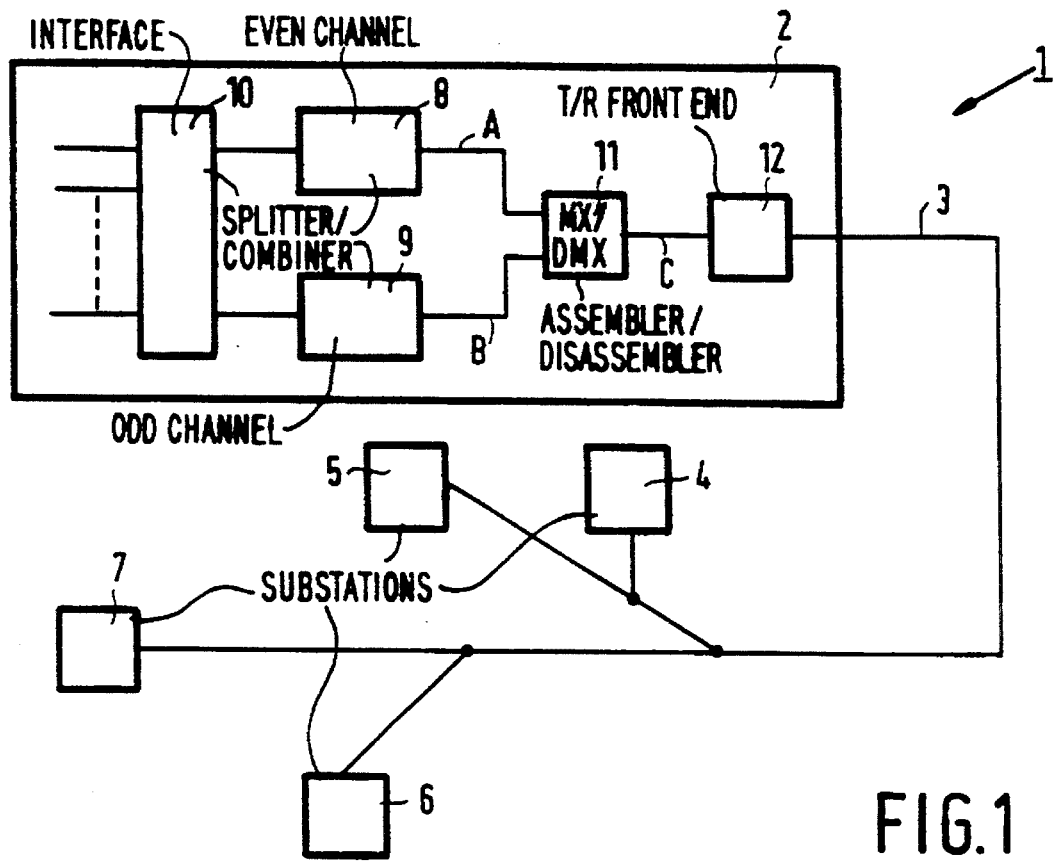

FIG. 1 schematically shows a passive optical network 1 as a telecommunications network according to the present invention comprising a main station 2 communicating via a transmission channel 3 with a plurality of substations 4, 5, 6 and 7. In practice there can be numerous substations. The channel 3, which at least partially is common to the substations 4 to 7, is an optical fibre cable. The main station 2 can be a local telephone exchange, and at the substations 4 to 7 a subscriber or a group of subscribers have access to various services such as telephone, facsimile and telex. In the latter case the network is a so-called TPON (Telephone Passive Optical Network). In a PON splitting and combining of optical signals on the channel for transport of information to and from the main station 2 is well-known. For details reference is made to said article of Hoppitt et al. At page 109 of the Hoppitt article, in FIG. 12 a downstream data-frame in a TPON-system is shown, and in FIG. 13 an upstream data-frame. In these data-frames synchronisation patterns are provided in the downstream data-frame, and ranging bits in the upstream data-frame. At page 110 of the Hoppitt article, in FIG. 14 a housekeeping control data frame is shown which is a part of the downstream frame. The frame structure of the present invention is a modified frame structure of bit interleaved sub-frames to be described hereinafter.

In the passive optical network 1 a multiple access protocol based communication between the main station 2 and the substations 4 to 7 occurs, such as TDMA (Time Division Multiple Access), well-known in the art. In such a network 1 the main station 2, being a master controlling the system 1, transmits TDMA-frames to the substations 4 to 7, in a so-called downstream direction, whereas the substations 4 to 7 transmit information in an upstream direction to the main station 2. Data on the fibre cable with a predetermined bit rate are perceived by all substations 4 to 7 with the same bit rate because of the passive splitting of the fibre cable 3. According to the present invention, the main station 2 comprises means for splitting data intended for the substations 4 to 7 into at least two logical sub-frames and means for assembling the sub-frames into a data-frame to be transmitted over the fibre cable 3 in the downstream direction. In FIG. 1 the means for splitting data, which will be described in more detail hereinafter, are comprised by an 'even channel' 8 and an 'odd channel' 9 coupled to an interface 10 for coupling to PCM lines of the PSTN (Public Switched Telephone Network). In the given example it is assumed that two sub-frames of data resepctively intended for two differential groups of substations are formed, but more generally n sub-frames, n being an integer greater than or equal to two, can be formed. In that case the means for splitting split the data into n channels. In this context 'channel' formation means processing of data into a form suitable for transmission over the fibre cable 3, i.e. including frame assembling and addition of housekeeping control data or the like. A multiplexer part of the multiplexer/demultiplexer (MX/DMX) 11 assembles a sub-frames into the data-frame comprising a bit interleaved combination of the of sub-frames. Thus, in the given example, the two sub-frames are bit interleaved. The MX/DMX 11 also assembles substation characterising data into the data-frame, in the given example a given synchronisation word for 'even channel' substations and an inversed synchronisation word for 'odd channel' substations. In one embodiment, the substations 4 to 7 are adjusted automatically on the basis of phase adjustment data transmitted by the main station 2 to the substations as housekeeping control data. The phase adjustment data inform the respective substations to which phase in the bit interleaved composition of sub-frames they should to listen. In operation the sub-stations adjust themselves to the correct phase in the interleaved bitstream at the fibre cable 3 on the basis of substation characterising data included in the interleaved bitstream. Thus, there are 'odd' and 'even' substations in the network 1, or more generally n different types of substations, from a logical point of view. In fact, each substation 4 to 7 is adjustable as an 'odd' or 'even' substation.

In the upstream direction, when the substations 4 to 7 are ranged in as usual, the substations transmit data to the main station 2 at positions in the upstream data frame corresponding to downstream their positions in the data-frame, i.e. in a bit interleaved way. In the main station 2 means for disassembling are comprised in the demultiplexer port of MX/DMA 11, which derives sub-frames of data from particular substations. Means for combining these sub-frames are comprised by the 'even' and 'odd channels' 8 and 9, and the interface 10. In case n=2, the network 1 according to the present invention can be apprehended as two 'half rate,' e.g. 20 Mbit/s, systems in parallel serving 'odd' and 'even' substations via the same glass fibre 3. From a logical point of view, the substations 4 to 7 operate at 20 Mbit/s, whereas the bit rate on the fibre cable 3 is 40 Mbit/s. Thus, from a network point of view, the capacity is doubled.

Figure 2:
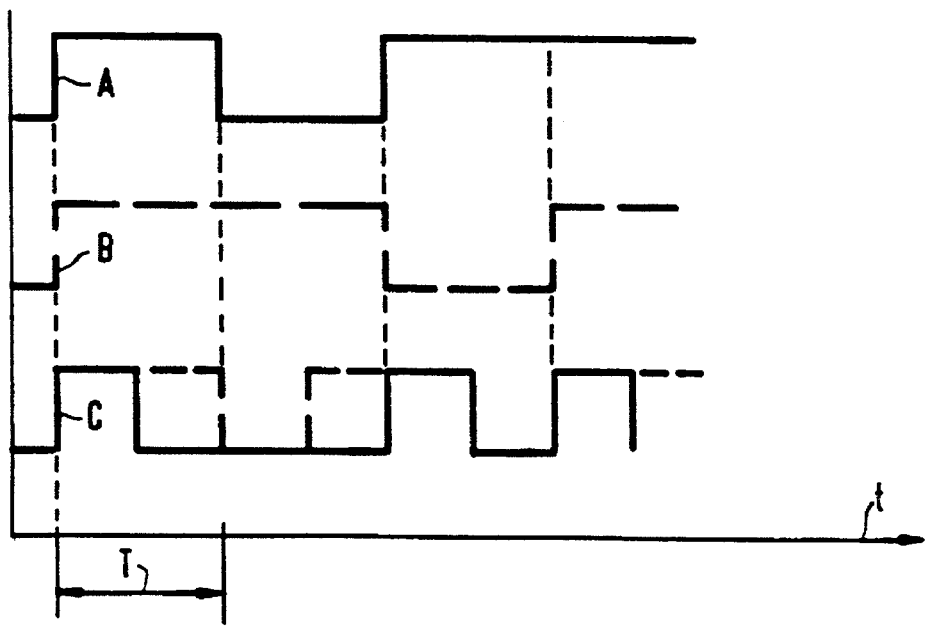
FIG. 2 shows multiplexer timing in a main station.

FIG. 2 shows multiplexer timing in the main station 2 of the MX/DMX 11 as a function of time t. A period T corresponds to non-interleaved transmission of data-frames, e.g. 20 Mbit./s. Signals A, B, and C are shown as indicated in FIG. 1, for n=2. In downstream direction the 20 Mbit/s sub-frames of the 'odd' and 'even channels' 8 and 9 are assembled separately and multiplexed as T/2 pulses in the main station 2 just in front of a laser transmitter in T/R front end unit 12 12. As a result a 40 Mbit/s transmission rate in the PON is achieved while each of the channels in the main station operates at 20 Mbit/s. Only the laser transmitter in T/R front end unit 12 of main station 2, the receiver front-end in the substations and their clock recovery circuits are operating at the higher bit rate of 40 Mbit/s. The substations 4 to 7 select either the 'odd bits' or the 'even bits', depending how they are adjusted. Although advantageously the substations 4 to 7 are adjusted automatically because of automatic adjustment to a varying traffic load, they may also be adjusted manually. In the latter case, the substations 4 to 7 are provided with manual adjusting means. In the upstream direction, the substations send T/2 pulses at a rate of 20 Mbit/s. Thus, all logic to assemble the upstream data-frame operates at a rate associated with a 20 Mbit/s data rate. The resulting bitstream of all substations is a 40 Mbit/s bitstream in upstream direction. In the main station 2 only the T/R front end unit 12 and the MX/DMX unit 12 for dis-assembling are arranged to process the 40 Mbit/s bitstream on the fibre 3. Further processing is done so as to process 20 Mbit/s bitstreams, as usual.

Figure 3:
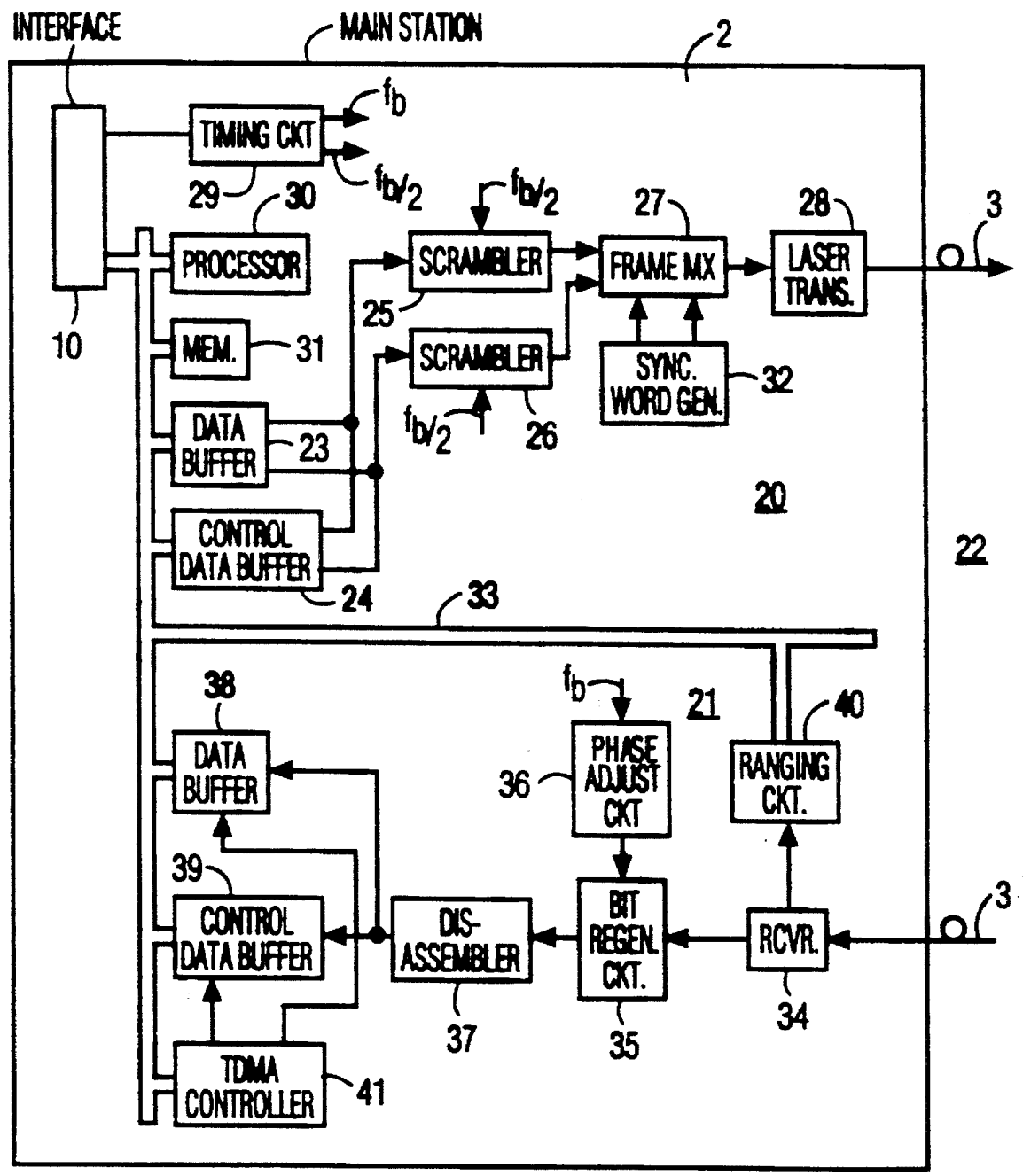
FIG. 3 shows a main station for use in the network according to the present invention

FIG. 3 shows a main station 2 for use in network 1 according to the present invention suitable for transmission and reception of TDMA signals. The main station 2 comprises a transmitter branch 20 and a receiver branch 21 coupled to a transmission channel 3. In the transmitter branch 20 subscriber signals for various substations are fed from the exchange interface 10 to a data buffer 23. The transmitter branch 20 further comprises a housekeeping control data buffer 24. In the given example, for n=2, data for the 'odd channel' are scrambled in a scrambler 25 and data for the 'even channel' are scrambled in a scrambler 26. Thus two sub-frames are built, which are fed to a frame having a frame multiplexer 27 so as to form a bit interleaved composition of sub-frames. This composition is fed to a laser transmitter 28, which is coupled to the fiber cable 3. The 'even' and 'odd channels' are clocked with $f_b/2$, $f_b$ being a master clock generated in the timing circuit 29. The main station 2 further comprises a processing unit 30 and a ROM/RAM memory 31, the memory storing a program to control the sub-frame building according to the present invention. The data-frame to be transmitted comprises synchronisation words, which are put into the data-frame by a synchronisation word generator 32. In case n=2, in an advantageous embodiment, the synchronisation words for the 'even channel' and the 'odd channel' are inversed ones, so that the substations can easily synchronise on the respective 'even' and 'odd channel'. The various processing units are coupled to a databus 33. The multiplexed signal may comprise coarse and fine ranging control information for ranging substations.

Signals from the substations 4 to 7 are received by a front end receiver 34, an output of which is coupled to a bit regenerator circuit 35 and to phase adjusting circuit 36. Since substations transmit with a recovered clock, only phase adjustment is required to align the regenerator 35 with the received data. An output of the bit regenerator circuit 35 is fed to a frame dis-assembling circuit 37. Then, the received subscriber data and housekeeping control data are stored in a respective data buffer 38 and a housekeeping buffer 39. The received subscriber data are fed to the interface 10, e.g. to the PSTN via PCM links. For ranging purposes the main station 2 comprises a ranging circuit 40 coupled to the front end receiver 34, which receives ranging information from the substations when they are requested by the main station in a ranging phase to send such information. Suitable ranging circuitry and algorithms are described inter alia in the above-identified published European Application Nrs. 93200743.8 and 93200742.0 and the corresponding pending U.S. applications Ser. No. 08/213,483 and Ser. No. 08/213,485, which are incorporated herein by reference. In one embodiment two completely separate branches for the 'even' and 'odd channel' can be used having regenerators with 180° shifted clock phases. In another embodiment the branches can be combined in a single T DMA/buffer architecture, controlled by a T DMA controller 41.

Figure 4:
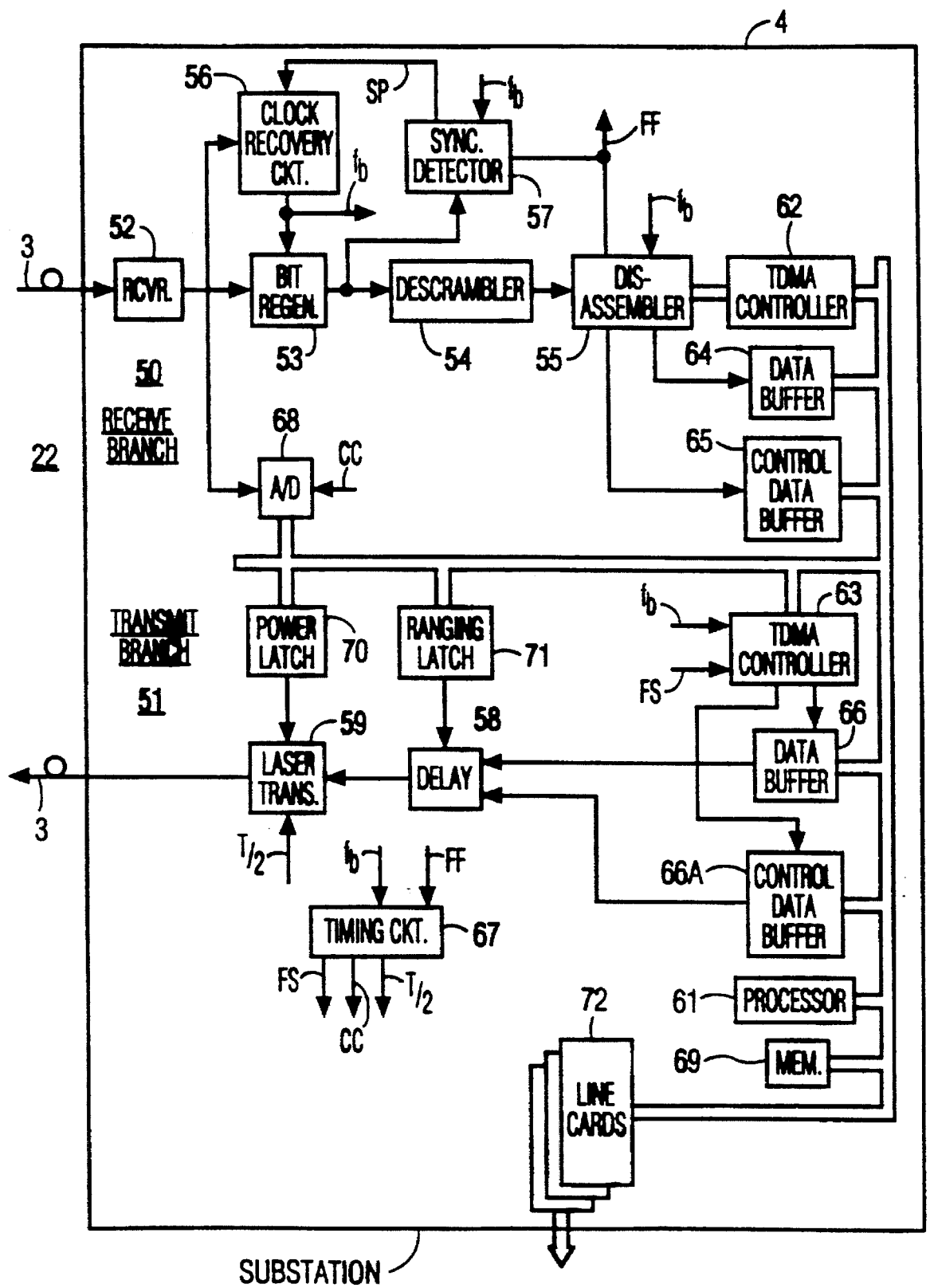
FIG. 4 shows a substation for use in the network according to the present invention, Throughout the figures the same reference numerals are used for the same features.

FIG. 4 shows a substation 4 for use in the network 1 according to the present invention. The substation 4 comprises a receiver branch 50 and a transmitter branch 51 coupled to the transmission channel 22, which is the optical fiber cable 3. The receiver branch 50 comprises a series arrangement of a front end receiver 52, a bit regenerator 53, a de-scrambler 54, and a frame dis-assembler 55. At the front end receiver output a clock is recovered by means of a clock detector circuit 56, whereas a sync detector 57 is coupled to the output of the bit regenerator 53. The transmitter branch 51 comprises the series arrangement of an adjustable delay line 58, for adjusting the substation 4 to the correct time slot in the upstream frame, and a laser transmitter 59. The 'odd/even' adjustment in the transmitter branch 51 can simply be done by adjusting an additional phase shift of half a bit period in the delay line 58, in case n=2. Then, the laser transmitter 59 converts the 20 Mbits pulses into half width optical pulses. Functionally, the substations 4 to 7 operate similar to the main station 2, as far as transmission and reception is concerned. For controlling the substation 4, the substation comprises various units coupled to a databus, under control of a processor 61 and/or T DMA controllers 62 and 63. In the receiver branch 50 a data buffer 64 and a housekeeping control data buffer 65 is provided, and in the transmitter branch 51 a data buffer 66 and a housekeeping control data buffer 66A. Furthermore the substation comprises a timing circuit 67 fed by a recovered clock signal $f_b$ and a sync signal FF, the timing circuit 67 providing a timing signal FS for the T DMA controller 63, a timing signal T/2 for the laser transmitter 59, and a timing signal CC for an analog-digital converter 68. The substation 4 comprises a ROM/RAM memory 69 programmed for controlling the substation 4 according to the present invention. The A/D-converter provides power control information and ranging information to a respective power control latch 70 and after processing to a ranging latch 71. Data received in the substation 4 is transported to individual subscriber via line cards 72. In case n is greater than 2, a substation can adjust itself to the correct phase in the interleaved datastream received from the main station 2 by first synchronising itself to a common synchronisation word and than adjust its phase on the basis of a channel indicator following the sync word. In case n=4, the phases are 0°, 90°, 180°, and 270°. Phase setting is done with a phase adjustment signal SP gained from the sync detector 57. A substation according to the present invention differs from a usual substation in that only the laser transmitter, the receiver front end, and the clock recovery circuit operate at the higher bit rate. Thus, a substation suitable to be coupled in a higher bit rate network is hardly more expensive than a usual substation and hardly consumes more power.

We claim:

1. A telecommunications network comprising a main station which is coupled by a transmission channel to a plurality of substations, the main station receiving a plurality of data messages addressed to respective substations and combining the data messages for transmission over the transmission channel; characterized in that:

the main station comprises interface means for combining the data messages by time division sampling to form a series of time division multiplex input data frames, each input data frame having time slots assigned to respective ones of said substations, the time slots having a predetermined bit rate;

frame splitting means coupled to said interface means for splitting each input data frame into a plurality n of sub-frames; where n≧2; each sub-frame having 1/n-th the number of time slots in an input data frame, so that each sub-frame has a bit rate which is 1/n-th said predetermined bit rate, any given sub-frame of each frame including the time slots assigned to a given set of said substations;

sub-frame assembling means coupled to said frame splitting means for combining the n sub-frames by bit interleaving, thereby forming a series of bit interleaved downstream data frames, and including in each downstream data frame characterizing information identifying the substations assigned to each of the sub-frames in said downstream data frame; and means for transmitting said series of downstream data frames over said transmission channel for reception therefrom by each of said substations; and each substation comprises means for adjusting the substation to receive data from each downstream data frame only during a sub-frame thereof to which said substation is assigned, as signified by the substation characterizing information included in the downstream data frame;

whereby each substation receives data from a downstream data frame at the bit rate of a sub-frame therein to which said substation is assigned, which bit rate is 1/n-th of said predetermined bit rate.

2. A telecommunications network as claimed in claim 1, wherein for transmission of data messages to the main station a substation transmits in a time slot assigned thereto in a sub-frame of each of a series of upstream data frames established by the main station, each upstream data frame comprising a plurality of bit interleaved sub-frames; the assigned time slot being at a position in a sub-frame of an upstream data frame corresponding to the position of the time slot assigned to said substation in a sub-frame of a downstream data frame; and wherein for reception of data messages from the substations the main station further comprises:

means for dis-assembling a received upstream data frame to recover therefrom bit interleaved sub-frames included therein; and combining means coupled to said dis-assembling means for combining the recovered sub-frames to form composite frames of data messages transmitted by said substations, the composite frames of data messages frames being supplied to said interface means for de-multiplexing to recover individual data messages therefrom.

3. A telecommunications system as claimed in claim 2, wherein said sub-frame assembling means and said means for dis-assembling operate at 1/nth of said predetermined bit rate, and said frame splitting means and said combining means operate at said predetermined bit rate.

4. A telecommunications system as claimed in claim 2, wherein said sub-frame assembling means, said means for dis-assembling, said frame splitting means and said combining means are all comprised in an integrated circuit which operates at said predetermined bit rate.

5. A telecommunications network as claimed in claim 2, wherein each substation adjusts to receive data during a particular phase of each downstream data frame on the basis of phase adjustment data provided by the main station in a housekeeping time slot of said downstream frame.

6. A telecommunications network as claimed in claim 1, wherein the substation characterizing information comprises a general synchronization word followed by a substation type identifier signifying a particular sub-frame of a data frame.

7. A telecommunications network as claimed in claim 1, wherein n=2 and the substation characterizing information comprises a first synchronization word for substations assigned to a first sub-frame of a data frame, and a second synchronization word for substations assigned to a second sub-frame of a data frame; the second synchronization word being the inverse of the first synchronization word.

8. A main station for use in a telecommunication network wherein said main station is coupled by a transmission channel to a plurality of substations, data messages addressed to respective substations being received by said main station for transmission to said substations; comprising:

interface means for combining the data messages by time division sampling to form a series of time division multiplex input data frames, each input data frame having time slots assigned to respective ones of said substations, the time slots having a predetermined bit rate;

frame splitting means coupled to said interface means for splitting each input data frame into a plurality n of sub-frames, where n≧2; each sub-frame having 1/n-th the number of time slots in an input data frame, so that each sub-frame has a bit rate which is 1/n-th said predetermined bit rate, any given sub-frame of each frame including the time slots assigned to a given set of said substations;

sub-frame assembling means coupled to said frame splitting means for combining the n sub-frames by bit interleaving, thereby forming a series of bit interleaved downstream data frames, and including in each downstream data frame characterizing information identifying the sub-stations assigned to each of the sub-frames in said downstream data frame; and means for transmitting said series of downstream data frames over said transmission channel for reception of the respective sub-frames therein by the respective sets of sub-stations assigned to said sub-frames.

9. A substation for use in a telecommunications network comprising a main station coupled by a transmission channel to a plurality of substations, communication of data messages from the main station to the substations being affected in time division multiplex data frames which comprise a plurality of bit interleaved sub-frames, respective sets of substations being assigned to time slots in respective sub-frames of each data frame, the main station providing in each data frame substation characterizing information which includes a general synchronization word followed by a substation type identifier signifying the sets of substations which are assigned to respective sub-frames of a data frame; said substation comprising:

means responsive to the synchronization word in a received data frame for synchronizing the substation to said data frame; and phase adjusting means for adjusting the substation to a correct receiving phase for a particular sub-frame of a received data frame, as signified by the sub-frame identifier relevant to said substation in the received data frame;

whereby each substation only monitors a received data frame during the sub-frame thereof to which said substation is assigned.

* * * * *